United States Patent
Kern et al.

(10) Patent No.: US 7,605,483 B2
(45) Date of Patent: Oct. 20, 2009

(54) INTEGRATED ELECTRICAL POWER EXTRACTION FOR AIRCRAFT ENGINES

(75) Inventors: John Michael Kern, Rexford, NY (US); Herman Lucas Norbert Wiegman, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 12/256,691

(22) Filed: Oct. 23, 2008

(65) Prior Publication Data
US 2009/0051219 A1 Feb. 26, 2009

Related U.S. Application Data

(62) Division of application No. 11/729,281, filed on Mar. 27, 2007, now Pat. No. 7,468,561.

(51) Int. Cl.
H02P 9/00 (2006.01)
F02C 1/06 (2006.01)

(52) U.S. Cl. .......................... 290/4 A; 290/52

(58) Field of Classification Search ............ 290/52, 290/4 A
See application file for complete search history.

(56) References Cited

U.S. PATENT DOCUMENTS

| | | | |
|---|---|---|---|
| 3,465,162 A * | 9/1969 | Oprecht | 290/4 R |
| 4,912,921 A * | 4/1990 | Rice et al. | 60/774 |
| 5,867,979 A | 2/1999 | Newton et al. | |
| 5,899,411 A | 5/1999 | Latos et al. | |
| 6,189,324 B1 | 2/2001 | Williams et al. | |
| 6,467,725 B1 | 10/2002 | Coles et al. | |
| 6,825,640 B1 | 11/2004 | Hill et al. | |
| 6,931,856 B2 * | 8/2005 | Belokon et al. | 60/772 |
| 7,216,475 B2 * | 5/2007 | Johnson | 60/226.1 |
| 7,224,082 B2 | 5/2007 | Bouiller et al. | |
| 7,285,871 B2 * | 10/2007 | Derouineau | 290/52 |
| 7,400,065 B2 | 7/2008 | Michalko | |
| 7,468,561 B2 * | 12/2008 | Kern et al. | 290/4 A |
| 7,514,810 B2 * | 4/2009 | Kern et al. | 290/52 |
| 2004/0189108 A1 | 9/2004 | Dooley | |

(Continued)

FOREIGN PATENT DOCUMENTS

EP 0798454 3/2006

(Continued)

*Primary Examiner*—Joseph Waks
(74) *Attorney, Agent, or Firm*—Penny A. Clarke

(57) ABSTRACT

An aircraft power system includes an aircraft engine having a plurality of engine spools, a plurality of AC generators driven by at least one spool, wherein each AC generator is independently operational to supply AC power to a respective AC power bus or a respective power electronics module, and at least one generator driven by a different engine spool, wherein the at least one generator is operational to supply additional AC power to each AC power bus in synchronization with each respective AC generator, or to supply additional AC power to each power electronics module in parallel with the AC power delivered to each power electronics module by the plurality of AC generators. The power electronics module(s) are operational to selectively provide either AC or DC power to desired distribution buses. Each AC generator and the at least one generator may be responsive to commands from an electrical power extraction (EPX) controller. At least one generator may be directly driven to provide variable frequency power.

18 Claims, 4 Drawing Sheets

U.S. PATENT DOCUMENTS

| | | |
|---|---|---|
| 2006/0012177 A1 | 1/2006 | Hoppe |
| 2006/0042252 A1 | 3/2006 | Derouineau |
| 2006/0174629 A1 | 8/2006 | Michalko |
| 2007/0151258 A1* | 7/2007 | Gaines et al. .................. 60/792 |
| 2007/0257558 A1 | 11/2007 | Berenger |
| 2007/0259545 A1* | 11/2007 | Berenger .................... 439/135 |
| 2008/0103632 A1 | 5/2008 | Saban et al. |
| 2008/0258560 A1* | 10/2008 | Dubois et al. ................. 307/31 |

FOREIGN PATENT DOCUMENTS

| | | |
|---|---|---|
| WO | 2006023981 | 3/2006 |
| WO | 2006024005 | 3/2006 |

* cited by examiner

INTEGRATED ELECTRICAL POWER EXTRACTION FOR AIRCRAFT ENGINES

This application is a divisional application of application Ser. No. 11/729,281, filed Mar. 27, 2007.

BACKGROUND

The present invention is directed to electrical power extraction from aircraft engines, and more particularly to an electrical power generation system which enables efficient and dynamic production of electrical power from a turbofan engine.

Individual components of turbofan engines require different power parameters during operation. The fan rotational speed, for example, is limited to a degree by the tip velocity and, since the fan diameter is very large, rotational speed must be relatively low. The core compressor, on the other hand, because of its much smaller tip diameter, can be driven at a higher rotational speed. Therefore, separate high and low speed turbines with independent power transmitting devices are necessary for the fan and core compressor in aircraft gas turbine engines. Furthermore since a turbine is most efficient at higher rotational speeds, the lower speed turbine driving the fan requires additional stages to extract the necessary power.

Many new aircraft systems are designed to accommodate electrical loads that are greater than those on current aircraft systems. The electrical system specifications of commercial airliner designs currently being developed may demand significantly increased electrical power from current commercial airliners as loads transition from hydraulic and pneumatic in nature to electrical. Many mechanical actuators, for example, are being implemented using electric motors, replacing traditional, heavier hydraulic systems. These increased electrical demands require larger generators to supply the additional electrical power.

The increased electrical power demand must be derived from mechanical power extracted from the engines that propel the aircraft. When operating an aircraft engine at relatively low power levels, e.g., while idly descending from altitude, extracting this additional electrical power from the engine mechanical power may affect the ability to operate the engine to operate properly.

Traditionally, electrical power is extracted from a high-pressure (HP) engine spool in a gas turbine engine. The high and relatively constant operating speed of the HP engine spool, compared to that of the low-pressure (LP) engine spool, makes it an ideal source of mechanical power to drive the electrical generators connected to the engine. However, this added load placed on the HP engine core, can have a detrimental effect on engine performance under certain conditions.

Drawing power from elsewhere in the engine therefore is necessary in certain cases, and can also be advantageous, by extracting that power in a more fuel-efficient manner. The LP engine spool can provide this alternate source of power. Additionally, by selectively controlling the extraction of electrical power from either the HP or LP engine spools, as desired, benefits in engine performance can be realized.

Specific low-power fault-tolerant permanent magnetic (PM) generator technology installed within a turbofan engine is known. Although fault tolerant PM generators have not yet been used at primary power levels, such generators have been used at low power lever (i.e. less than 500 Watts). There has been however, no use of high power PM generators on turbo fan engines to date, for reasons of cost, complexity, and unproven technology, among other things.

Aircraft engine power extraction control systems are also known. Some of these systems include multiple generators controlled by a central control system. Although 400 Hz systems often run in parallel (aka, military transports and B747-400), variable frequency generators however (non-400 Hz), are not seamlessly paralleled or integrated with one another.

Generator arrangements including LP permanent magnet generators with some form of electrical control system are known in the prior art. None of these arrangements are known to be integrated with other sources (APU or HP driven).

Methods and systems directed to coordinating loads seen by each of the HP and LP generators are known to selectively switch or reduce the loads as the engine conditions permit. These methods and systems are not seamlessly integrated with an aircraft power system.

Multiple (i.e. three) spool engines having a generator on each shaft for supplying power to the engine itself, in addition to an airframe is also known in the art. This technology is not seamlessly integrated with an aircraft power system.

DC generators on LP spools are known in the prior art for providing power to DC busses. These LP generators require a device such as an inverter to interface DC to an AC bus. These approaches disadvantageously require significant integration with an airframe power system, and are not seamlessly integrated with the airframe power system.

In view of the foregoing, it would be advantageous and beneficial to provide a system and method for selectively controlling the extraction of electrical power from either the HP or LP engine spools, as desired, to optimize benefits in engine performance. It would be further advantageous if this system and method were to be seamlessly integrated with an airframe power system.

BRIEF DESCRIPTION OF THE INVENTION

The present invention is directed to an aircraft engine comprising a plurality of engine spools in which a plurality of AC bus generators are driven by at least one engine spool, and further wherein each AC bus generator is independently operational to supply AC power to a respective AC power bus; and at least one generator driven by a different engine spool, wherein the at least one generator is operational to supply AC power to each AC power bus in synchronization with each respective AC bus generator. One or more of the AC bus generators and/or the at least one generator may be a directly driven generator that provides variable frequency power.

Each starter-generator and at least one generator may be responsive to commands from an electrical power extraction (EPX) controller.

A method of providing aircraft power according to one embodiment comprises 1) driving a plurality of AC generators via an aircraft engine spool such that each AC generator provides AC power to a respective AC bus, 2) driving at least one generator via a different aircraft engine spool to selectively provide additional AC power to each respective AC bus, and 3) controlling at least one generator to selectively synchronize the AC power generated via at least one generator with the AC power generated via the plurality of AC generators. The plurality of AC generators and/or the at least one generator may be directly driven to provide variable frequency power.

Another embodiment is directed to an aircraft engine comprising an aircraft engine and a plurality of AC generators driven by the aircraft engine, wherein each AC generator is independently operational to supply AC power to a desired power electronics module in response to commands from an electrical power extraction (EPX) controller; and at least one generator driven by the aircraft engine, wherein the at least one generator is operational to selectively supply additional AC power to each desired power electronics module in parallel with each respective AC generator in response to commands from the EPX controller.

Yet another embodiment is directed to an aircraft engine comprising an aircraft engine comprising a plurality of engine spools and a plurality of AC bus generators driven by at least one engine spool, wherein each AC bus generator is independently operational to supply AC power to a respective power electronics module; and at least one generator driven by a different engine spool, wherein the at least one generator is operational to supply additional AC power to each power electronics module in parallel with each respective AC generator.

Still another embodiment is directed to a method of providing aircraft power in which the method comprises 1) driving a plurality of generators via an aircraft engine spool such that each generator provides AC power to a respective power electronic system; 2) driving at least one generator via a different engine spool to selectively provide additional AC power to each power electronics system; and 3) controlling the at least one generator to selectively supply additional AC power to each power electronics system in parallel with each respective AC generator.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
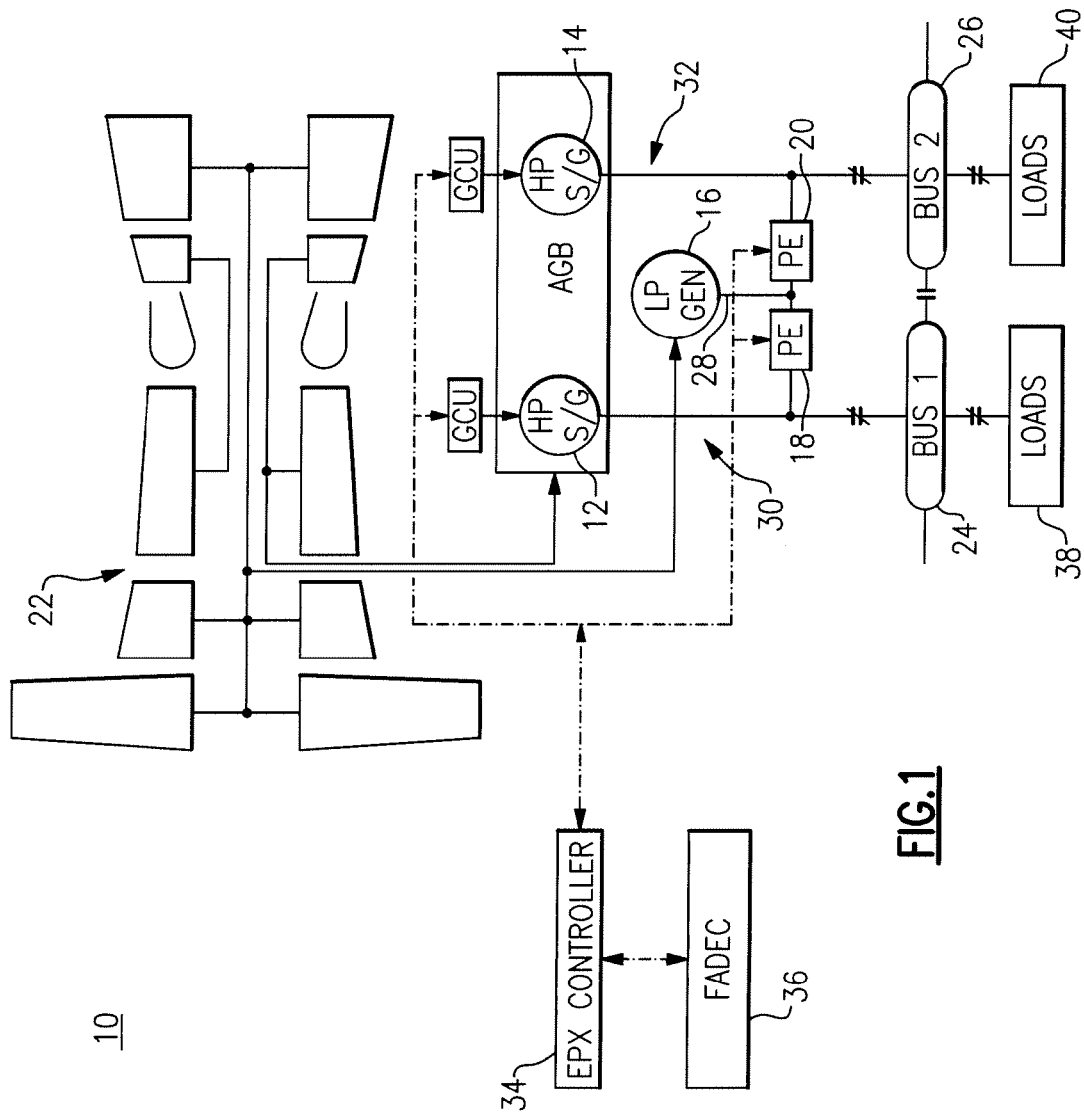
FIG. 1 illustrates a wild frequency electrical power extraction system architecture with an externally located LP generator, according to one embodiment of the present invention.

FIG. 1 illustrates a wild frequency electrical power extraction system architecture 10 with an externally located LP generator 16, according to one embodiment of the present invention. A key feature of the systems and methods described herein below is that these systems and methods enable the seamless integration of an LP generator with existing HP starter-generators, with transparency to an airframe power system (i.e., it is fully compatible with most commonly used aircraft power systems). Although some embodiments are described with reference to HP starter-generators, other embodiments may just as easily employ HP generators that do not provide a start function to achieve the desired results according to the principles discussed herein below.

With continued reference to FIG. 1, all of the HP starter-generators 12, 14, the LP generator 16, and power electronics (PE) 18, 20 associated with EPX system architecture 10 can be seen to be located externally to the engine 22. The electrical power supplied by the LP generator 16 is then processed using power electronics 18, 20 and synchronized to each of the independently-supplied (wild-frequency (WF) or constant-frequency (CF)) buses 24, 26. The LP generator 16 output 28 is divided between two identical channels 30, 32. An EPX controller 34 in communication with a full authority digital engine control (FADEC) unit 36 commands the LP power electronics 18, 20 to pick up or shed AC bus loads 38, 40 for the LP generator 16. This combined approach enables the engine controller (FADEC) to selectively load either LP or HP engine spools, as desired, to yield improvements in fuel efficiency, transient performance, stall margins, or other parameters.

Alternatively, the EPX controller 34 can be designed to operate independently and without direct FADEC unit 36 supervision. By monitoring the frequency of the HP generator 12 outputs, it is possible to determine the operating point of the engine, and therefore schedule the HP/LP load sharing as desired.

Control of the electrical load amounts carried by each respective starter-generator/generator 12, 14, 16 can be achieved, for example, by modifying the output power angle of power electronics 18, 20 relative to the fundamental HP starter-generator 12, 14 electrical frequency. The present invention is not so limited however, and other control techniques can just as easily be applied, such as, but not limited to, voltage droop methods.

Division of the power electronics 18, 20 into two parallel channels 30, 32 also advantageously provides a measure of reliability for the LP generating system. The LP generator 16, itself may be designed to fail safely under all operating conditions (including the most severe internal stator winding fault). It should be noted that engine starting through the HP starter-generators 12, 14 can still be provided through another installed set of power electronics (not shown) that is independent of the EPX system 10.

In summary explanation, an electrical power extraction system architecture 10 can be advantageously applied without significant modification to an existing airframe power system. The EPX system architecture 10 enables the seamless integration of an LP generator 16 with existing HP starter-generators 12, 14, with transparency to the airframe power system (i.e., it is fully compatible with most commonly used aircraft power systems).

Figure 2:
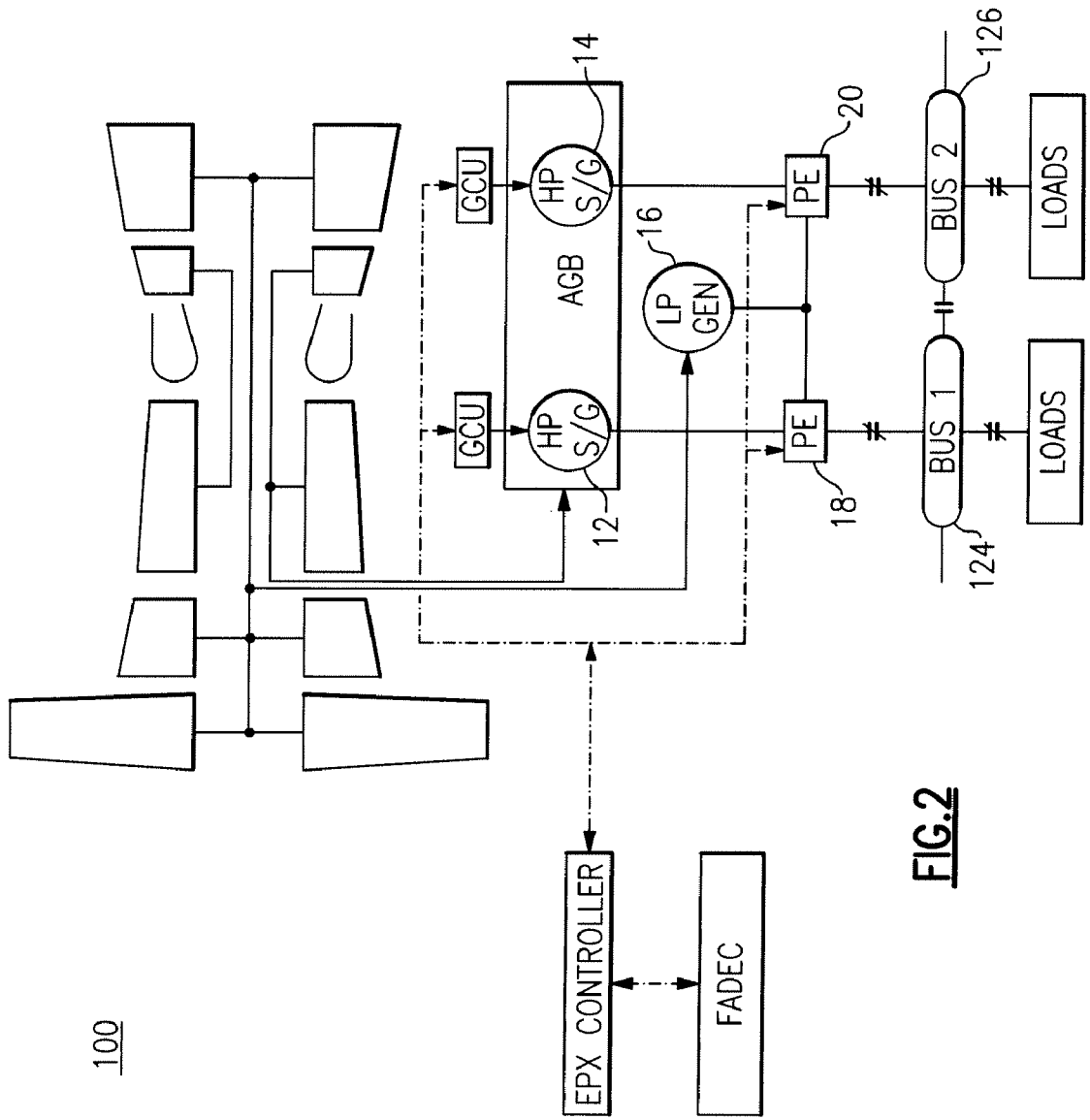
FIG. 2 illustrates a constant frequency electrical power extraction system architecture with an externally located LP generator, according to one embodiment of the present invention.

FIG. 2 illustrates a constant frequency electrical power extraction system architecture 100 with an externally located LP generator 16, according to one embodiment of the present invention. The power electronics 18, 20 in EPX system 100 are modified to provide the generation of constant-frequency AC power to an aircraft power system. A constant 400 Hz power system may be desirable from an airframer perspective, as it represents the standard that has been used in aircraft power systems for decades.

The power electronics 18, 20 need only be modified by the addition of a passive rectifier to allow the output of the HP starter-generators 12, 14 to be paralleled at DC links within power electronics 18, 20. A DC-to-AC output inverter stage within power electronics 18, 20 is then used to synthesize constant-frequency AC power, thus avoiding the need to install an entirely independent set of power electronics for the HP starter-generators 12, 14 alone. The rating of the power electronics 18, 20 can advantageously also remain at levels less than the total installed generating capacity, as the specified power system loads may be less than that amount.

Many different AC-to-DC conversion schemes can be employed within power electronics 18, 20 to allow the outputs of the HP starter-generators 12, 14 and LP generator 16 to be paralleled at DC links within power electronics 18, 20. Further, eliminating DC-to-AC output inverter stages within power electronics 18, 20 then will then allow DC power to be distributed to power buses 124, 126.

Since the rectifier used at the HP starter-generators 12, 14 could also be active (controllable), the power electronics 18, 20 could then also be used for HP engine starting. It should also be apparent that all other benefits described for the embodiment of FIG. 1 are retained in the embodiment of FIG. 2.

Figure 3:
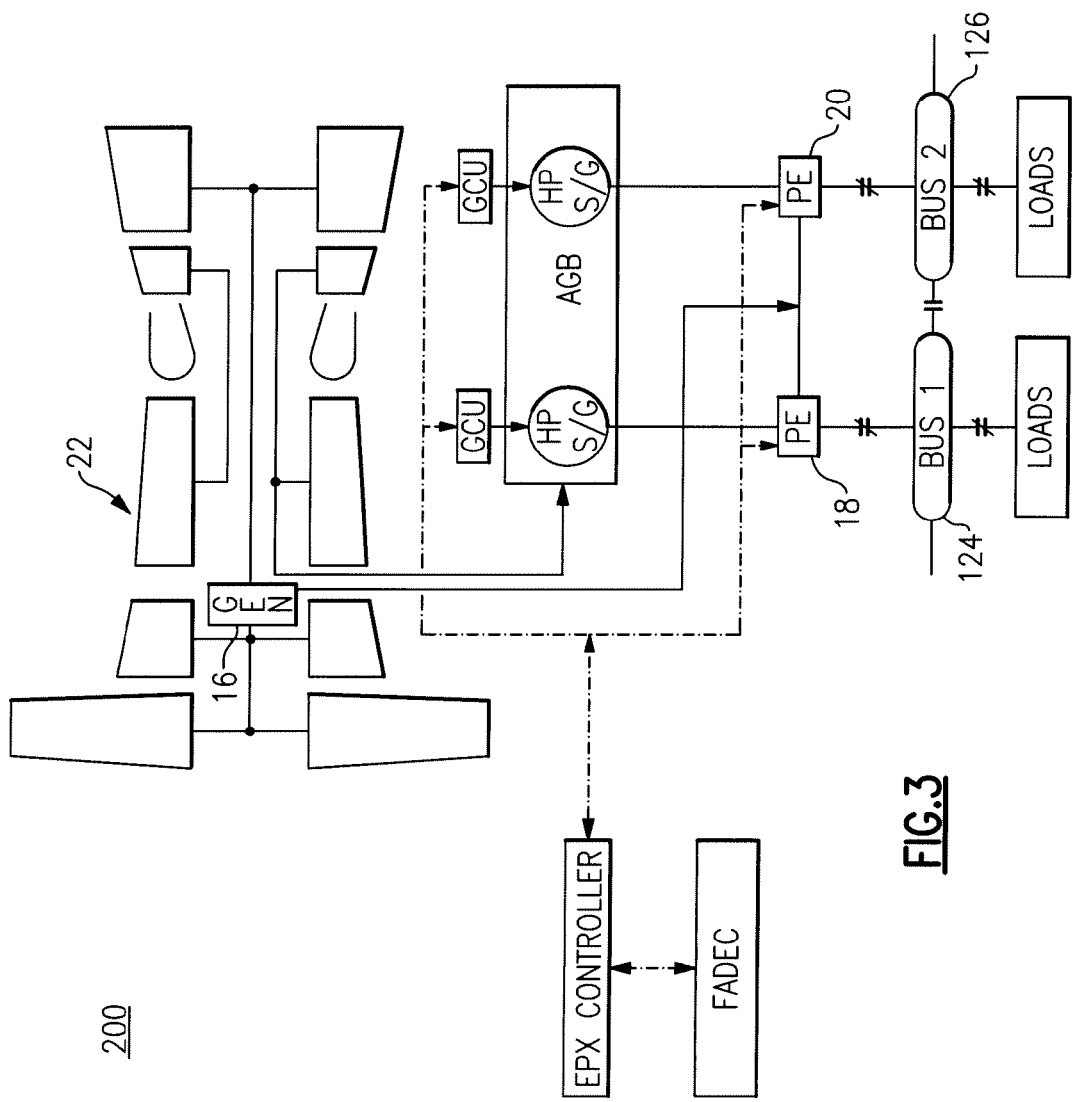
FIG. 3 illustrates a constant frequency electrical power extraction system architecture with an internally located LP generator, according to one embodiment of the present invention.

FIG. 3 illustrates a constant frequency electrical power extraction system architecture 200 with an internally located LP generator 16, according to one embodiment of the present invention. The embodiment shown in FIG. 3 is similar to the embodiment shown in FIG. 1, being modified only by placing the LP generator 16 at a location that is internal to the engine 22. The present invention is not so limited however, and those skilled in the art will readily appreciate that numerous implementations of this internally installed LP generator 16 may be accommodated in accordance with the principles described herein. The embodiment shown in FIG. 3 also retains all other benefits available when using the embodiment shown in FIG. 1 and described herein before.

DC power distribution can be obtained simply by eliminating use of DC-to-AC power inverters within power electronics 18, 20, as described herein before with reference to FIG. 2. Buses 124, 126 can then be implemented as either AC power busses or DC power busses, depending on the power electronics 18, 20 topology.

Figure 4:
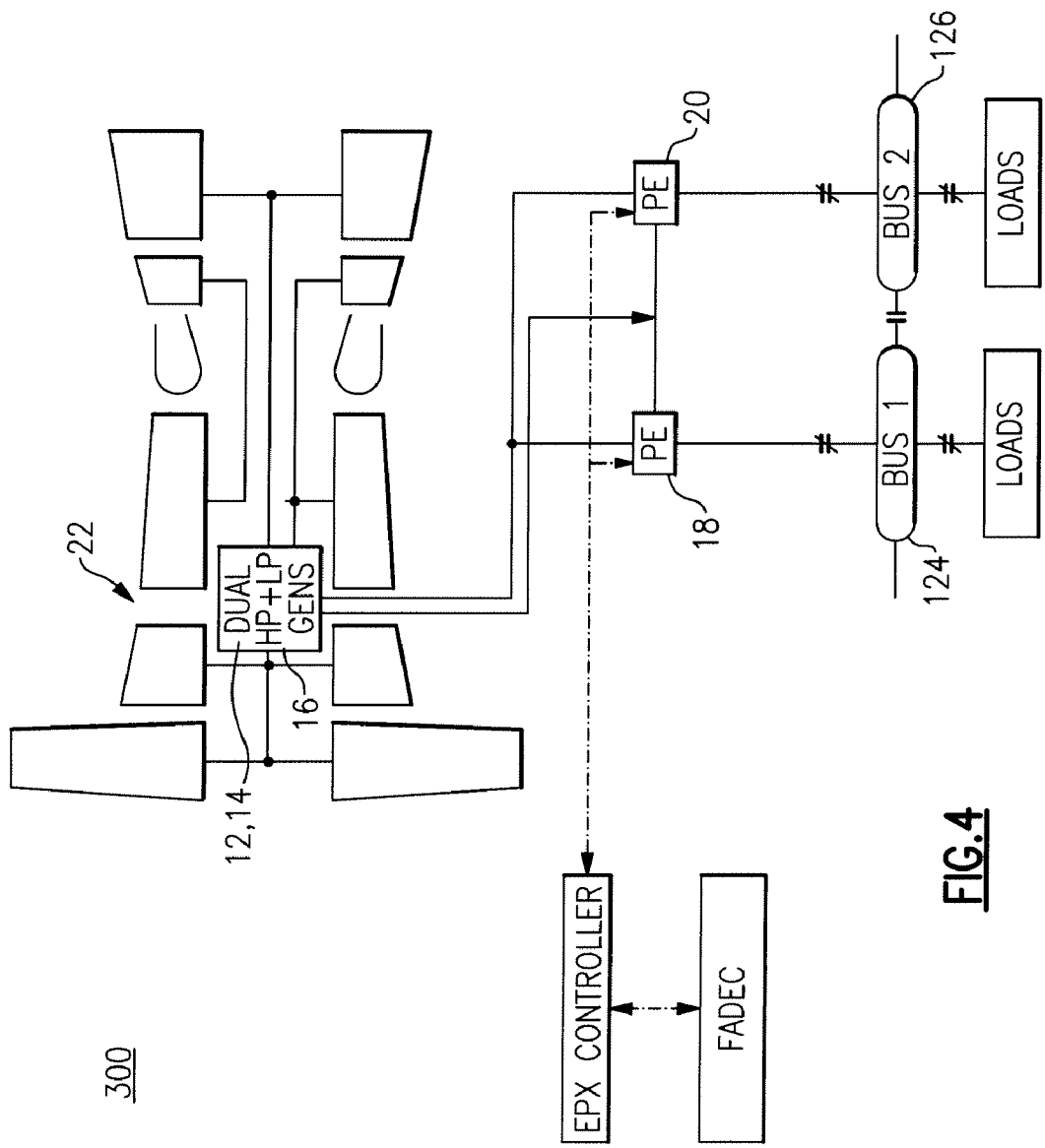
FIG. 4 illustrates a constant frequency electrical power extraction system architecture with dual internal HP and LP generators, according to one embodiment of the present invention.

FIG. 4 illustrates a constant frequency electrical power extraction system architecture 300 with dual internal HP and LP generators 12, 14, 16, according to one embodiment of the present invention. The EPX system architecture 300 represents an extension of all three embodiments described herein before with reference to FIGS. 1-3, in that the LP generator 16 and HP generators 12, 14 can not only be located within the engine 22, but also in the form of a dual, integrated machine. This integrated machine comprises concentric layers including an inner rotor for HP/middle stator for HP and LP/outer rotor for LP. The present invention is not limited to use of a particular integrated machine architecture however. Numerous implementations of an internal LP generator can be employed to implement the embodiments described herein above, so long as the embodiments are implemented in accordance with the principles described herein before.

Again, DC power distribution can be obtained simply by eliminating use of DC-to-AC power inverters within power electronics 18, 20, as described herein before with reference to FIG. 2. Buses 124, 126 can then be implemented as either AC power busses or DC power busses, depending on the power electronics 18, 20 topology.

Electrical power extraction system architectures described with reference to FIGS. 1-4 advantageously enable fuel saving entitlements through FADEC-controlled EPX. If engine design is specifically EPX-optimized, it can represent fuel savings beyond that achievable with presently known engines.

Installation of LP generation may enable a reduction in HP S/G generating capacity requirements. It also enables incremental machine implementations, starting with external LP generators, and provides a path to internal installation, such as described herein before with reference to FIGS. 3 and 4.

Installation of LP generation, as described above, also enables implementation of incremental power electronics, including WF, DC, and 400 Hz, as well as provision of power electronics for increased engine starting capabilities.

Since PM machines reach closest to power density and efficiency entitlement, PM technology can be spiraled to HP generators in future embodiments. Modular power electronics enable full physical integration with an engine.

Modular power electronics also enable integration with a power system that is transparent to an airframer. By allowing LP fans to windmill for power, downsizing or elimination of a ram air turbine emergency generating system may also be possible.

Transient engine performance can be influenced with selective HP/LP loading associated with embodiments described herein before with reference to FIGS. 1-4.

Thus, a complete electrical power generation system has been described that provides integrated, flexible power extraction within an engine to enable efficient and dynamic production of electrical power from a turbofan engine. The engine's low-pressure (LP) spool is coupled to an electrical generator having its output paralleled with the output of generators driven by the engine's high-pressure (HP) spool. Electrical paralleling of multiple generators is accomplished through robust power electronics, and optimally controlled through commands issued by the engine controller. The power from these combined sources can then be processed via power electronics to supply power of the type preferred by the airframer (e.g., WF, DC, or 400 Hz).

Hp-driven generators today are typically wound-field synchronous machines having electrical frequencies directly proportional to the engine core speed, as stated herein before. A future, LP-driven generator may be a robust, power-dense permanent magnet machine, in that it is designed to fail safely under all conditions. Power electronics described herein before are used to regulate the output voltage of this type of generator, and also perform the additional function of synchronizing to the electrical frequency of the HP-driven generator(s).

The electrical power extraction systems and methods described herein enable the seamless integration of an LP generator with existing HP starter-generators, with transparency to the airframe power system (i.e. it is fully compatible with most commonly used aircraft power systems).

The embodiments described herein also provide a system-level approach for an electrical power extraction system that enables seamless integration of additional power generating capabilities at the engine level. The result is transparent to the airframe's power system.

The electrical power extraction system architecture described herein before has been shown to allow the power extraction from an engine to be coordinated by an FADEC controller to yield increased fuel savings, engine operability, and dynamic performance, among other things. Alternatively, power extraction could be scheduled in a manner that operates in response to changes in engine power as observed by monitoring HP generator frequency.

Further, the electrical power extraction system architecture can be implemented in incremental stages, whether external or internal to the engine.

The electrical power extraction system architecture, as discussed herein before, can generate wild frequency, constant frequency power, or DC, as desired, and further includes inherent levels of redundancy that is reliable to help ensure safe operation in flight.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method of providing aircraft power, the method comprising the steps of:
    driving a plurality of generators via an aircraft engine spool such that each generator provides AC power to a respective AC bus;
    driving at least one generator via a different engine spool to selectively provide additional AC power to each respective AC bus; and
    controlling the at least one generator to selectively synchronize the additional AC power generated via the at least one generator with the AC power generated via the plurality of generators.

2. The method of claim 1, further comprising the step of controlling the at least one generator to pick-up or shed loads supplied via at least one AC generator to selectively load the engine spools.

3. The method of claim 1, wherein the step of controlling the at least one generator comprises transmitting commands via an electrical power extraction (EPX) controller to a plurality of generator power electronics (PE) modules, wherein each PE module is associated with a respective AC bus.

4. The method of claim 3, further comprising the step of transmitting commands via an engine control unit to the EPX controller in response to desired engine parameters selected from fuel efficiency parameters, transient performance parameters, and stall margin parameters.

5. The method of claim 3, wherein the step of transmitting commands via an engine control unit comprises transmitting commands via a full authority digital engine controller (FADEC).

6. The method of claim 1, wherein the step of driving a plurality of generators comprises driving the plurality of generators to selectively generate wild AC power or constant AC power.

7. The method of claim 1, wherein the step of driving at least one generator comprises driving the at least one generator to selectively generate wild AC power or constant AC power.

8. An aircraft power system comprising:
    an aircraft engine;
    a plurality of AC generators driven by the aircraft engine, wherein each AC generator is independently operational to supply AC power to a respective AC power bus in response to commands from an electrical power extraction (EPX) controller ; and
    at least one generator driven by the aircraft engine, wherein the at least one generator is operational to selectively supply additional AC power to each AC power bus in synchronization with each respective AC generator in response to commands from the EPX controller.

9. The aircraft power system according to claim 8, further comprising an engine controller selected from an electronics engine controller (EEC) and a full authority digital engine controller (FADEC), wherein the engine controller transmits commands to the EPX controller in response to desired engine parameters.

10. The aircraft power system according to claim 9, wherein the desired engine parameters are selected from fuel efficiency parameters, transient performance parameters, and stall margin parameters, to selectively load aircraft engine spools.

11. The aircraft power system according to claim 8, wherein at least one generator is a directly driven generator.

12. A method of providing aircraft power, the method comprising the steps of:
    driving a plurality of generators via an aircraft engine spool such that each generator provides AC power to a respective power electronic system;
    driving at least one generator via a different engine spool to selectively provide additional AC power to each power electronics system; and
    controlling the at least one generator to selectively supply additional AC power to each power electronics system in parallel with each respective AC generator.

13. The method of claim 12, further comprising the step of controlling the at least one generator to pick-up or shed loads supplied via the plurality of generators to selectively load the engine spools.

14. The method of claim 13 wherein the step of controlling the at least one generator comprises transmitting commands via an electrical power extraction (EPX) controller to the power electronics modules, wherein each power electronics module is associated with a respective power bus.

15. The method of claim 14, further comprising the step of transmitting commands via an engine control unit to the EPX controller in response to desired engine parameters selected from fuel efficiency parameters, transient performance parameters, and stall margin parameters.

16. The method of claim 15, wherein the step of transmitting commands via an engine control unit comprises transmitting commands via a full authority digital engine controller (FADEC).

17. The method of claim 12, wherein the step of driving a plurality of generators comprises directly driving the plurality of generators to selectively generate wild AC power or constant AC power.

18. The method of claim 12, wherein the step of driving at least one generator comprises driving the at least one generator to selectively generate wild AC power or constant AC power.

* * * * *